(No Model.) 2 Sheets—Sheet 1.
T. H. BRIGG.
MEANS FOR CONNECTING DRAFT ANIMALS TO VEHICLES.
No. 517,640. Patented Apr. 3, 1894.
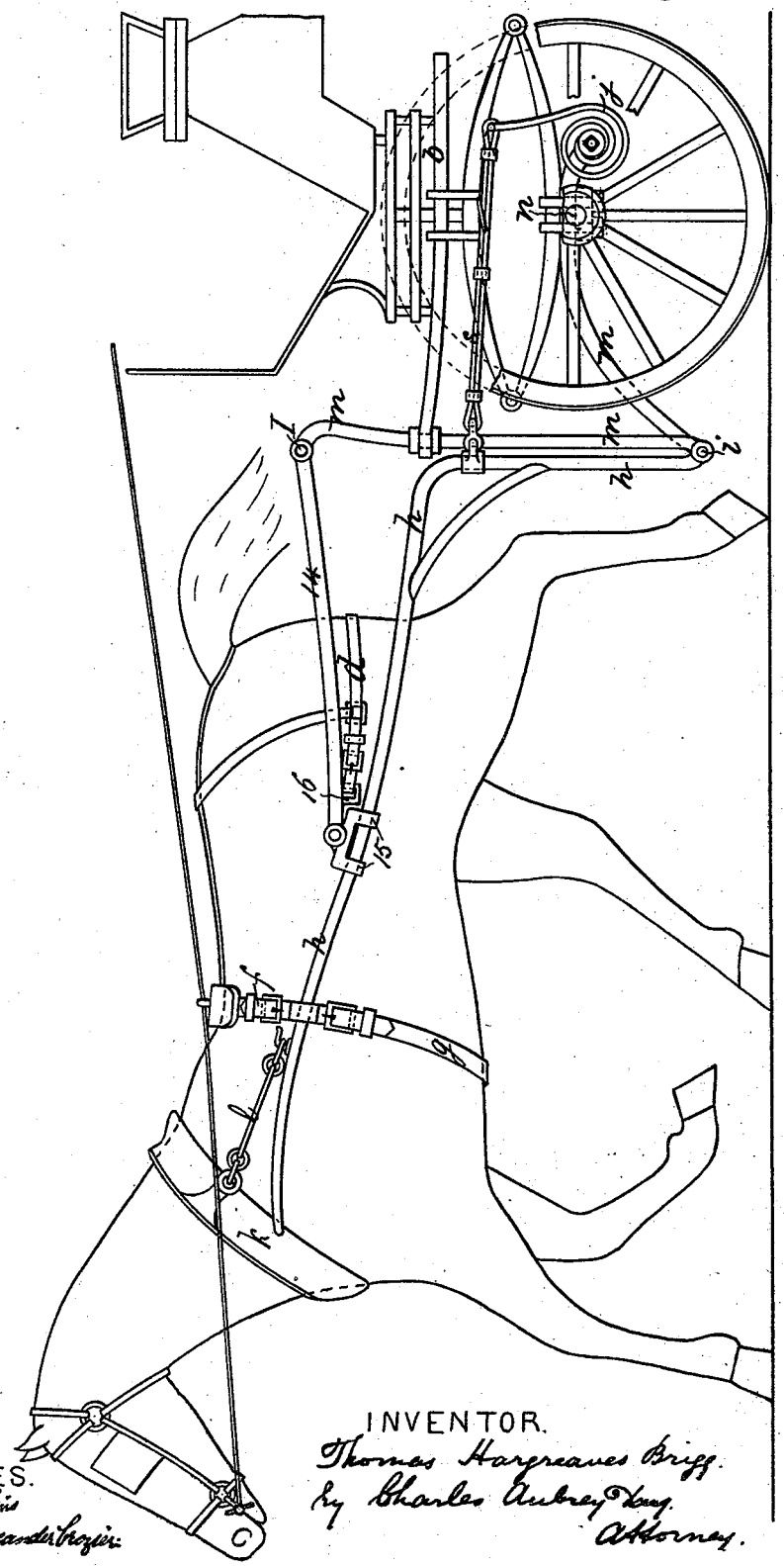
FIG. I.
WITNESSES.
INVENTOR.
Thomas Hargreaves Brigg.
by Charles Aubrey Day.
Attorney.

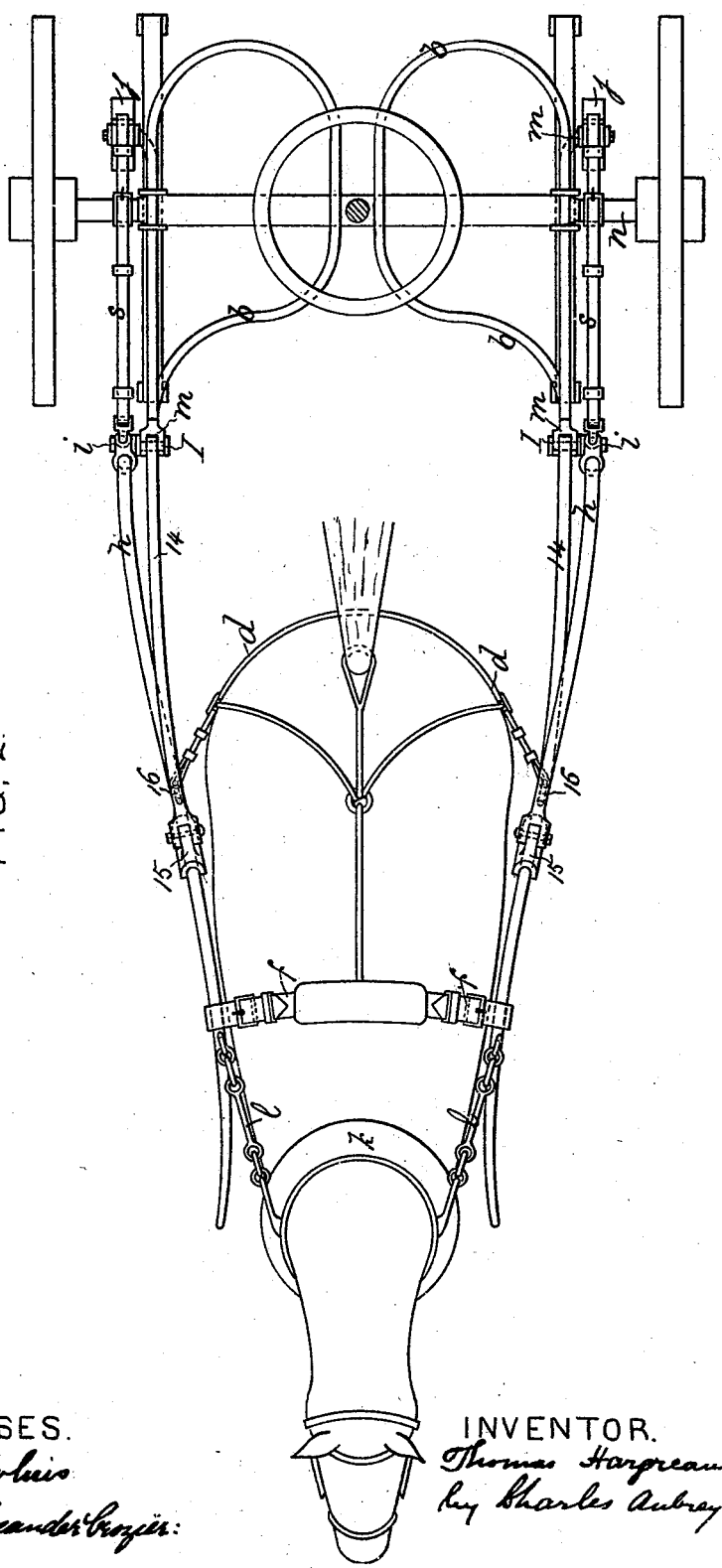

UNITED STATES PATENT OFFICE.

THOMAS HARGREAVES BRIGG, OF BRADFORD, ENGLAND.

MEANS FOR CONNECTING DRAFT-ANIMALS TO VEHICLES.

SPECIFICATION forming part of Letters Patent No. 517,640, dated April 3, 1894.

Application filed September 12, 1893. Serial No. 485,367. (No model.)

*To all whom it may concern:*

Be it known that I, THOMAS HARGREAVES BRIGG, of Bradford, Yorkshire, England, have invented certain Improved Means for Connecting Draft-Animals to Vehicles, of which the following is a specification.

This invention relates to improved means of connecting draft animals to vehicles, ground implements and the like having fore and aft axles and wheels or other fore and aft bearings upon the ground and fore-carriages or equivalent turning or steering parts.

The invention is a development of the invention described in the specification of another application for Letters Patent filed on even date herewith, Serial No. 485,366, and consists in the combination with the rigid, arched, peculiarly-connected, spring-controlled trace-levers, for which I am seeking a patent by my aforesaid application, when applied to vehicles of the nature aforesaid, of combined backing and steering attachments of the nature hereinafter described.

In the accompanying drawings,—Figure 1 represents a side elevation of the fore part of a two-axled wheeled vehicle having a fore-carriage, showing the same as fitted with the present improved draft device, with the animal in draft, and Fig. 2, represents a plan thereof.

*h*, represents the aforesaid rigid, arched, peculiarly-connected, spring-controlled trace levers described in my aforesaid specification. Such trace-levers have their ends disposed in a downwardly inclined plane or planes relative to flexible connections to the animal at the hame or collar and their rear ends pivotally connected to the fore-carriage *b*, at as low points of attachment *i*, as convenient, and which may, conveniently, be supported by depending brackets *m*, bolted to the fore axle *n*. Such trace levers are also (at or toward their forward ends) connected to the animal by means of a belly-band *g*, adapted to support the animal's fore-quarters, and a back-band *f*, adapted to bring downward pressure upon the animal's fore-quarters. Such trace-levers are also (at any convenient parts of their arched parts) connected to the fore-carriage by adjustable straps *s*, and adjustable springs *j*, which latter may, conveniently, be supported by rearward extensions of the brackets *m*, and normally tend to raise the fore ends of the trace-levers and the belly-band and to more or less support the fore-quarters of the connected animal. Such trace-levers are also (at any convenient parts of their arched parts, or at or forward of their connections to the belly-band and back-band) connected to the animal at the hame or collar *k*, by means of flexible trace connections *l*, so applied as normally to occupy an ordinary inclination (such as that of ordinary traces connected directly from the hame or collar to the ordinary trace-hooks of a fore-carriage) and as, when in tension, to tend to draw the ends of the trace-levers into alignment with the attachments to the hame so as to variably counteract said supporting action of the springs effected through the trace-levers and belly-band, in the ratio of the pull exerted by the animal; all as more fully described in my aforesaid specification.

14, represents the aforesaid combined steering and backing attachments, which consist of rods, tubes or equivalent rigid connections constructed of metal, wood or other suitable material, and pivotally connected at their rear ends to the fore-carriage at as high points I, (which also may be conveniently supported by extensions of the bracket *m*,) as convenient and pivotally connected at their forward ends to sleeves or clasps 15, adapted to engage with and slide on forward parts of the trace-levers *h*, in any readily separable manner, the rods 14, being also connected, at any convenient parts 16, by a breech-strap *d*. By the use of such rigid, arched, peculiarly-connected, spring-controlled trace-levers *h*, conjointly with such combined steering and backing attachments 14, I am enabled to obtain in addition to the continuous automatic relation between the work required to be done by the connected animal and the necessary expenditure of the animal's energy to perform such work, and to the support and relief afforded to the animal by means of said trace-levers applied as described in my aforesaid specification to vehicles of the nature aforesaid, the further advantages of steering the fore-carriage and backing the vehicle with the same appliance, whereby I am enabled to entirely dispense with the ordinary shafts or pole connections used for steering and backing the vehicles with the trace-levers described in my aforesaid specification.

The turning movements of the animal are imparted to the fore-carriage through the connections of the trace-levers $h$ and the rods 14, at 15, and their respective connections at the low and high points $i$, I, with the fore-carriage, which is thus most easily steered. Said attachments 14, are also of very considerable advantage in enabling the animal to exert a greatly increased backing resistance than it can exert when backing through ordinary shafts, as, in the latter case, the forward motion of the vehicle tends to lift the animal at the haunches and decreases its resistance and backing power, whereas, with the said highly connected backing attachments 14, the forward motion of the vehicle tends to bear downwardly on the animal and to add weight at the haunches and so increase the animal's resistance and backing power.

I claim as my invention—

In combination, rigid, arched trace-levers having their ends disposed in a downwardly inclined plane or planes relative to flexible connections to the animal at the hame, and their rear-ends pivotally connected to a lowly depending part of the fore-carriage; continuing flexible trace connections tending, when in draft, to draw the ends of the trace-levers into alignment with the attachments to the hame, a belly-band connected to the trace-levers and adapted to bring downward pressure on the animal's fore-quarters; a spring or springs connected to the fore-carriage and to the arched parts of the trace-levers tending to raise the fore-parts of the levers; and combined steering and backing attachments connected to the trace-levers at forward parts, and to the fore-carriage at high points of attachment and together by a breech-strap; the whole co-operating as set forth.

In testimony whereof I have signed my name to this specification in the presence of two subscribing witnesses.

THOMAS HARGREAVES BRIGG.

Witnesses:
HARRY WHARTON,
JOHN FORETIER CRISP.